United States Patent
Nogues et al.

(10) Patent No.: US 10,531,096 B2
(45) Date of Patent: Jan. 7, 2020

(54) DECODER, METHOD AND SYSTEM FOR DECODING MULTIMEDIA STREAMS

(71) Applicants: INSTITUT NATIONAL DES SCIENCES APPLIQUEES DE RENNES, Rennes (FR); CENTRE NATIONAL DE LA RECHERCHE SCIENTIFIQUE, Paris (FR)

(72) Inventors: Erwan Nogues, Rennes (FR); Daniel Menard, Domloup (FR); Maxime Pelcat, Rennes (FR); Erwan Raffin, Acigne (FR)

(73) Assignees: INSTITUT NATIONAL DES SCIENCES APPLIQUEES DE RENNES, Rennes (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/519,333

(22) PCT Filed: Oct. 16, 2015

(86) PCT No.: PCT/EP2015/073964
§ 371 (c)(1),
(2) Date: Apr. 14, 2017

(87) PCT Pub. No.: WO2016/059196
PCT Pub. Date: Apr. 21, 2016

(65) Prior Publication Data
US 2017/0237988 A1    Aug. 17, 2017

(30) Foreign Application Priority Data
Oct. 17, 2014 (FR) ..................... 14 60043
Feb. 10, 2015 (FR) ..................... 15 51085

(51) Int. Cl.
*H04N 19/156* (2014.01)
*H04N 19/159* (2014.01)
(Continued)

(52) U.S. Cl.
CPC ......... *H04N 19/156* (2014.11); *H04N 19/117* (2014.11); *H04N 19/132* (2014.11);
(Continued)

(58) Field of Classification Search
None
See application file for complete search history.

(56) References Cited

U.S. PATENT DOCUMENTS

2002/0080874 A1    6/2002 Wilson
2011/0066263 A1*   3/2011 Iwai ................. G10L 19/22
                                                 700/94

(Continued)

OTHER PUBLICATIONS

International Search Report for PCT/EP2015/073964, dated Dec. 21, 2015.
(Continued)

*Primary Examiner* — Lindsay J Uhl
(74) *Attorney, Agent, or Firm* — Meagher Emanuel Laks Goldberg & Liao, LLP

(57) ABSTRACT

Decoder, system and method for decoding multimedia data at the level of a terminal by managing the energy available for decoding comprising a decoder of the multimedia data, characterized in that said decoder comprises at least one low-consumption decoding chain comprising an activation module suitable for activating a first low-consumption decoding chain or loop filter and a low-consumption interpolation chain as a function of at least one parameter representative of constraints of user energy and/or of the mobile terminal and of one or more metadata $M_d$ associated with a decoding complexity and/or with a decoding energy.

13 Claims, 5 Drawing Sheets

(51) Int. Cl.
*H04N 19/117* (2014.01)
*H04N 19/154* (2014.01)
*H04N 19/44* (2014.01)
*H04N 19/82* (2014.01)
*H04N 19/132* (2014.01)

(52) U.S. Cl.
CPC ......... *H04N 19/154* (2014.11); *H04N 19/159* (2014.11); *H04N 19/44* (2014.11); *H04N 19/82* (2014.11)

(56) References Cited

U.S. PATENT DOCUMENTS

2012/0213276 A1* 8/2012 Hagai .................. H04N 19/159
                                                      375/240.12
2013/0194505 A1* 8/2013 Pahalawatta ............. H04N 5/21
                                                      348/607
2014/0010282 A1* 1/2014 He ................... H04N 21/23439
                                                      375/240.02

OTHER PUBLICATIONS

International Written Opinion for PCT/EP2015/073964, dated Dec. 21, 2015.
Eduardo Juarez et al: "Proposal of a decoder Energy Management Scheme with RVC", 103. MEPG Meeting; Jan. 21, 2013-Jan. 25, 2013; Geneva; (Motion Picture Expert Group or ISO/IEC JTC1/SC29/WG11), No. m28171, Jan. 16, 2013 (Jan. 16, 2013).

* cited by examiner

DECODER, METHOD AND SYSTEM FOR DECODING MULTIMEDIA STREAMS

FIELD OF THE INVENTION

The invention relates to a decoding device, a method and a system allowing the decoding of multimedia data at the level of a terminal while managing the consumption of energy required for decoding and for playing back a multimedia data stream. The invention applies for video decoders, for terminals using the standards H.264/AVC for Advanced Video Coding or H.265/HEVC for High Efficiency Video Coding.

BACKGROUND

Today's electronic kit such as mobiles, Smartphones, tablets, etc., are offering ever more functionalities, such as video, audio, GPS (Global Positioning System) positioning system, Internet and various connectivities, for example radio multi-systems with Wifi, Bluetooth, UMTS (Universal Mobile Telecommunication System), HSPA (High Speed Packet Access), LTE-Advanced network technology, which means that today the energy capacity of these onboard systems is under great strain. In the years ahead it is estimated that at least 70% of mobile communications will be transfers of video content. Conscious of these issues, the MPEG committee within the ISO has launched an initiative aimed at standardizing means allowing video decoders to minimize their energy consumption and thus to improve their duration of use. This standard is known by the name "Green Metadata". Various solutions are known from the prior art and described in the ISO/IEC DIS 23001-11 standard of the "Green Metadata" standard.

To manage energy consumption in the best way, the Samsung company is proposing to modify the on-screen display of video and to reduce the screen supply voltage. Another procedure proposed by this company is dynamic control of the frequency which consists in anticipating and in adapting the computational power to the complexity of the video to be decoded.

The Thomson Video Network company is proposing an adaptive streaming procedure which consists in offering the decoder several versions of one and the same video on a DASH server, the abbreviation standing for Dynamic Adaptive streaming over http.

The Morphbius company is proposing an undersampled encoder in which the encoding of the data is carried out at reduced quality.

FIG. 1 is a reminder of the principle implemented in managing the energy of a mobile terminal. To increase the possibilities for making savings, the standard proposes to exchange metadata from an encoder 1 to one or more final decoders 2 (a single decoder is represented in the figure for reasons of simplification). In addition to the conventional data stream generated by the video coder, the metadata $M_d$ are multiplexed with the conventional data stream F, to obtain a data stream $F_m$. This data stream $F_m$ is thereafter transmitted to a receiver 2 through a communication network, for example. The type of network used depends on the application or on the system considered. The protocol put in place is then different. Telebroadcasting, better known by the term "broadcast" or "streaming", may be cited as an example. The insertion of the metadata then depends on the protocol or on the mode of transport. They can be inserted into additional enhancement information (or SEI, short for Supplemental Enhancement Information, message) or else be encapsulated in higher-level descriptions such as the type known by the name MPD (Media Presentation Description) for streaming applications for example of the aforementioned DASH type. The metadata emission frequency can occur at several levels, for example, at the frame level, at the Group of Pictures or GOP (17 frames for example) level. The decoder will test in the associated field in a frame the presence or otherwise of the metadatum for the sequence to be decoded. The encoder can take a decision regarding a change of metadata streaming frequency when parameters evolve such as an evolution of content (change of scene) or of type of compression (quantization parameter).

A preprocessor 101 analyses the source content $F_s$ and a video coder 102 encodes the content of an input video. The data stream containing the coded data and the metadata is transmitted to the receiver and decoded by a video decoder 106 which transmits the decoded information to a display module 109. The metadatum Md is extracted by means of an analyzer 104 at the level of the video encoder 102 and in this case the metadatum is encapsulated in a stream in accordance with the format of the video encoder, or at the level 103 of the preprocessor 101 and the metadatum is then multiplexed with the stream. The metadatum $M_d$ is used by the final decoder 2 to reduce the power required for decoding and for presentation of the data. At the level of the final decoder 2, the video decoder 106 analyses, 107, the stream $F_m$ containing the multimedia stream F and the metadata $M_d$, and transmits the metadata $M_d$ to a power or energy control module 108. This energy control module will, for example, decode the metadatum or metadata $M_d$ and then apply energy consumption reduction operations for the decoding and the display of the video streams, $P_c$ for example. The same energy control module is present at the coder level.

FIG. 2 represents a known architecture of the video encoder comprising a video decoder 20. The video input (compressed data) is transmitted to a transformation module 111 an output of which is linked with an encoding module 112 and an inverse quantization and transformation module 113. The coded multimedia data $F_c$ are transmitted to a stream generation module 114 which will also receive motion estimation information arising from a motion estimation module 115 which receives, on the one hand the video input $E_v$, and on the other hand an image resulting from the application of a loop filter 116 (known to the person skilled in the art) receiving the motion compensation parameters or vectors 117 to be applied to the parameters of the image and the image parameters obtained by applying the inverse quantization inverse transform. An output of the loop filter generates a video output $S_v$. The stream generation module produces a compressed data stream which will be transmitted to the decoder. A buffer memory 119 allows the storage of the video images before transmission to the motion compensation module and to the motion estimation module 115.

Patent application US 2002080874 describes a system for decoding a data stream representative of a video content and deals with the capacity of decoders of varied complexity of architectures to decode an incoming stream.

In the following description, the word terminal refers, for example, to a mobile, a tablet or any connected device making it possible to receive multimedia streams. The term multimedia stream can refer to various programs, such as films, music (video clip), which are distributed through communication networks.

SUMMARY OF THE INVENTION

The subject of the present invention relates to a method and a system making it possible to manage the energy required for the decoding of information, of multimedia data, of video data. It also makes it possible to simplify the complexity of the filters used, the consumption of the filters representing an appreciable part of a decoder's consumption.

The invention relates to a device for decoding a multimedia data stream at the level of a terminal by managing the energy required for decoding comprising a decoder of said multimedia data, and being characterized in that said decoder comprises at least one "low-consumption" decoding chain comprising an activation module suitable for activating a first low-consumption decoding chain or loop filter and a low-consumption interpolation chain as a function of at least one parameter representative of constraints of user operation and/or user energy and/or of the mobile terminal and of one or more metadata $M_d$ associated with a maximum degradation of quality, with a decoding complexity and/or with an energy required for decoding.

The invention also relates to a system for decoding a multimedia data stream at the level of a terminal by managing the energy required for decoding, characterized in that it comprises at least the following elements:
  an encoder of the multimedia data comprising at least one module suitable for generating one or more metadata $M_d$ associated with a decoding complexity and/or with an energy of decoding of the multimedia data stream decoded by the decoder,
  a decoder comprising at least one standard decoding chain, at least one extraction module for extracting the metadata $M_d$ contained in the multimedia data stream, an activation module linked to a switch suitable for activating a first low-consumption decoding chain or loop filter and to a switch so as to activate a low-consumption interpolation chain as a function of at least one parameter representative of energy constraints and of one or more metadata $M_d$ contained in the multimedia data stream.

According to a variant embodiment, the encoder comprises a modified decoder comprising a low-consumption loop filter, an energy estimation module, a standard decoder comprising an energy estimation module, a metadatum $M_d$ is a pair of values (maximum degradation, potential gain in energy) determined on the basis of the multimedia data $E_V$, of the data $S_{V2}$ decoded by the standard decoder, of an energy value $E_2$ estimated by the standard decoder, of the data $S_{V1}$ decoded by the modified decoder, of the energy $E_1$ estimated by the modified decoder.

According to a variant embodiment, the module for generating metadata and the decoders are suitable for:
  Determining the gains in energy MGE=1−($E_1/E_2$)*100, with $E_1$ the energy estimated by the modified decoder, $E_2$ the energy estimated by the standard decoder,
  Determining the degradation of quality by computing the value of power to noise ratio PSNR on the set of images of the data stream on the basis of an image decoded by the standard decoding chain and on the basis of an image decoded by the low-consumption decoding chain,
  $PSNR_{ReferenceDecoder}=10*\log_{10}(d^2/MSE)$, d corresponding to the maximum amplitude of the pixels, for example 255 for pixels coded on 8 bits or 1023 for pixels coded on 10 bits, MSE corresponding to the mean square error $(E_V-S_{V2})^2$ between the reference data stream $E_V$ and the data stream decoded by the standard decoder $S_{V2}$,
  $PSNR_{ModififedDecoder}=10*\log_{10}(d^2/MSE)$ with MSE corresponding to the mean square error $(E_V-S_{V1})^2$ between the reference data stream $E_V$ and the data stream decoded by the modified decoder $S_{V1}$,
  Computing the value of the degradation of quality, Degradation=$PSNR_{Referencedecoder}-PSNR_{Modifieddecoder}$ The metadatum can be a pair of values (maximum degradation, potential gain in complexity).

The system considers a measured level of energy remaining for the battery of a mobile terminal as energy constraint.

According to one embodiment, the low-consumption filters are finite impulse response filters.

A metadatum $M_d$ can be determined on the basis of the values of maximum degradation, potential gain, and of the values of coefficients of "low-consumption" filters.

The system can also comprise a prediction module for predicting the type or types of frames present in the multimedia stream, the module for activating the simplified filtering chains being activated as a function of a type of frame or of their position in the multimedia data stream.

The decoder is, for example, an H.264/AVC decoder or an H.265/HEVC decoder and the data stream video images.

The invention also relates to a method for decoding data of a multimedia data stream at the level of a terminal by managing the energy required for decoding, characterized in that it comprises at least the following steps:
  Determining at least one parameter representative of user operation and/or user energy constraints and/or constraints associated with the operation of the terminal,
  Activating a low-consumption decoding chain at the level of a decoder of multimedia data or a standard decoding chain, as a function of the value of these parameters and of values of metadata $M_d$ associated with a maximum degradation of quality, with a decoding complexity and/or with a decoding energy required for decoding.

The method generates a metadatum corresponding to a pair of values (maximum degradation, potential gain in energy), these values being computed during a step of coding the multimedia data while taking account of the multimedia data $E_V$, of the data $S_{V2}$ decoded by a standard decoder, of an energy value $E_2$ estimated by the standard decoder, of the data $S_{V1}$ decoded by a modified decoder, of the energy $E_1$ estimated by the modified decoder.

According to a variant embodiment, a metadatum is computed in the following manner:
  Determine the gains in energy MGE=1−($E_1/E_2$)*100, with $E_1$ the energy estimated by the modified decoder, $E_2$ the energy estimated by the standard decoder,
  Determine the degradation of quality by computing the value of power to noise ratio PSNR on the set of images of the data stream on the basis of an image decoded by the standard decoding chain and on the basis of an image decoded by the low-consumption decoding chain,
  $PSNR_{ReferenceDecoder}=10*\log_{10}(d^2/MSE)$, d corresponding to the maximum amplitude of the pixels, MSE corresponding to the mean square error $(E_V-S_{V2})^2$ between the reference data stream $E_V$ and the data stream decoded by the standard decoder $S_{V2}$,
  $PSNR_{ModififedDecoder}=10*\log_{10}(d^2/MSE)$ with MSE corresponding to the mean square error $(E_V-S_{V1})^2$ between the reference data stream $E_V$ and the data stream decoded by the modified decoder $S_{V1}$,
  Compute the value of the degradation of quality, Degradation=$PSNR_{Referencedecoder}-PSNR_{Modifieddecoder}$.

The method takes a measurement of energy level for the battery of the terminal as energy constraint.

The method is, for example, implemented in an H.264/AVC or H.265/HEVC decoder and the data stream consists of video images.

BRIEF DESCRIPTION OF THE DRAWINGS

Other characteristics and advantages of the present invention will become more apparent on reading the illustrative and wholly non-limiting description which follows, together with the figures which represent.

DETAILED DESCRIPTION

The description will be given by way of example so as to illustrate the principle implemented by the invention for a video stream that a user wishes to download onto his terminal in the case of the HEVC standard. The final decoder will adapt the best decoding strategy to its means, by deducing from metadata $M_d$, associated with the management of the energy at the decoding level, the possible gains in energy consumption that may be achieved by virtue of the use of modified filtering functions, in particular by simplifying the filters present in the video decoding chain. A metadatum can represent a gain in decoding complexity which makes it possible to deduce an instantaneous energy or power reduction by the decoder. The metadata $M_d$ in the present invention are a distortion/savings pair between the low-consumption chains and a standard chain.

Figure 1:
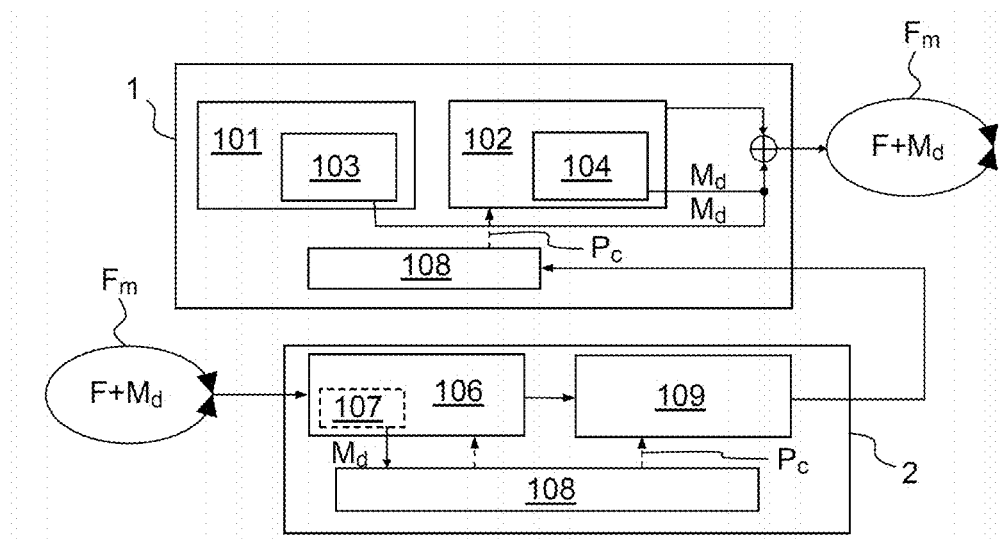
FIG. 1, a reminder of an emitter receiver diagram with exchange of metadata.
Figure 2:
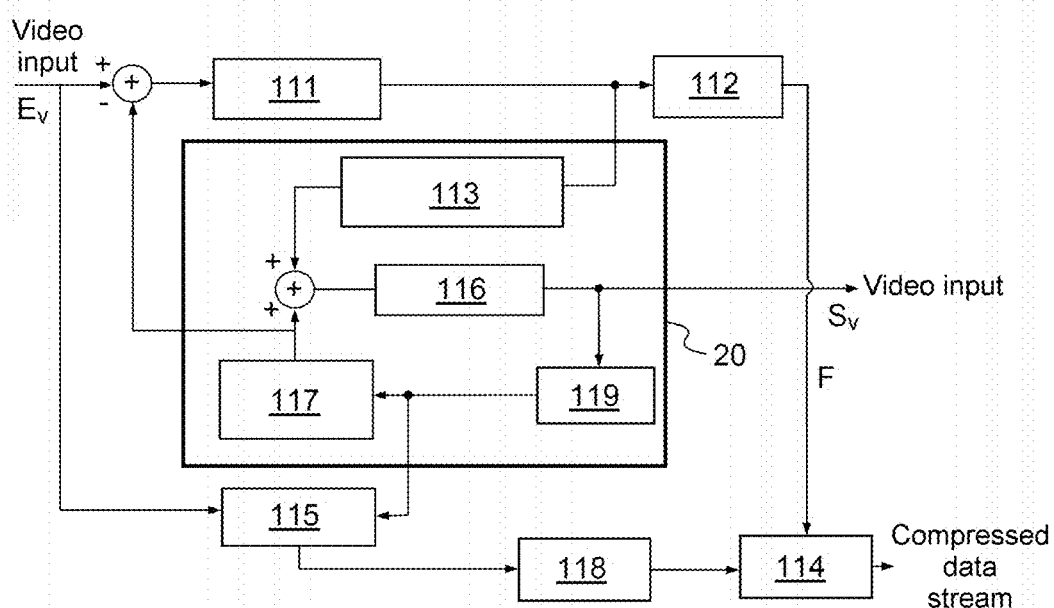
FIG. 2, a video coder diagram according to the prior art.
Figure 3:
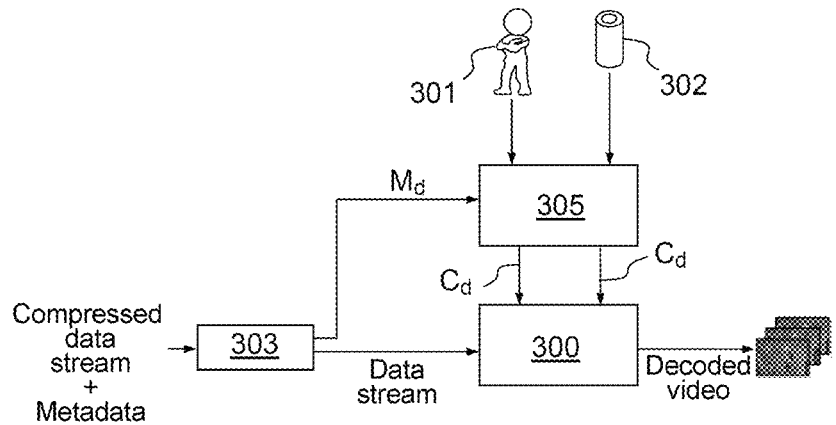
FIG. 3, a basic diagram of the system according to the invention.

FIG. 3 is a basic diagram of the operation of the system according to the invention according to user constraints 301 and/or according to a battery level of a mobile device 302. The system receives a stream $F_m$ composed of compressed data F and of metadata $M_d$ generated by a modified encoder detailed in FIG. 4, the total stream $F_m$ is transmitted to a demultiplexer 303 so as to generate the compressed data stream and the metadata. The metadata $M_d$ are transmitted to an activation decision module 305 of the filtering chain of a modified video decoder 300. The decision module 305 assesses whether it is appropriate to activate the modified filtering chain of the video decoder as a function, for example, of the battery level of the terminal measured by an appropriate module, indicating whether or not it is necessary to make gains in energy and by how much, and/or of user constraints and/or of operating constraints, indicating for example an authorized maximum degradation, requirements of quality of decoding of a user, a degradation of quality, a complexity of decoding or an energy required for the desired decoding. As a function of one or more of these parameters, the decision regarding activation of the modified filters, command $C_d$, is dispatched to the modified video decoder 300. The compressed data stream F transmitted to the modified video decoder 300 is thereafter decoded by the final video decoder by passing either through a conventional processing chain or a simplified processing chain according to the invention, an example of which is given in FIG. 5. The activation decision may be modified when a new metadatum is dispatched for the following sequence.

Figure 5:
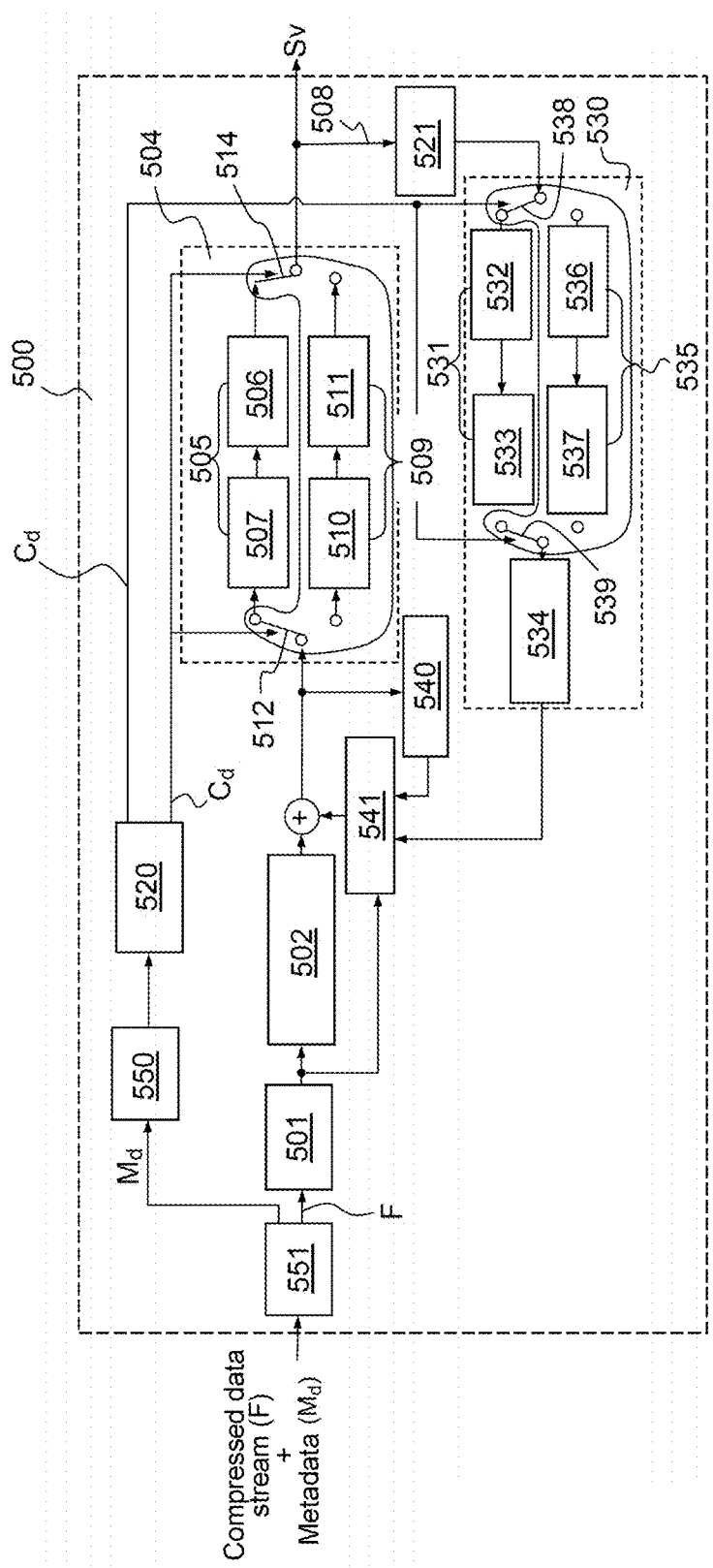

One of the operating assumptions of the system according to the invention is as follows: subject to the compromise of reduced quality of the decoded video, appreciable gains in energy consumption can be achieved. These gains are realized in particular by virtue of the use of modified filtering functions (FIG. 5, for example).

Figure 4:
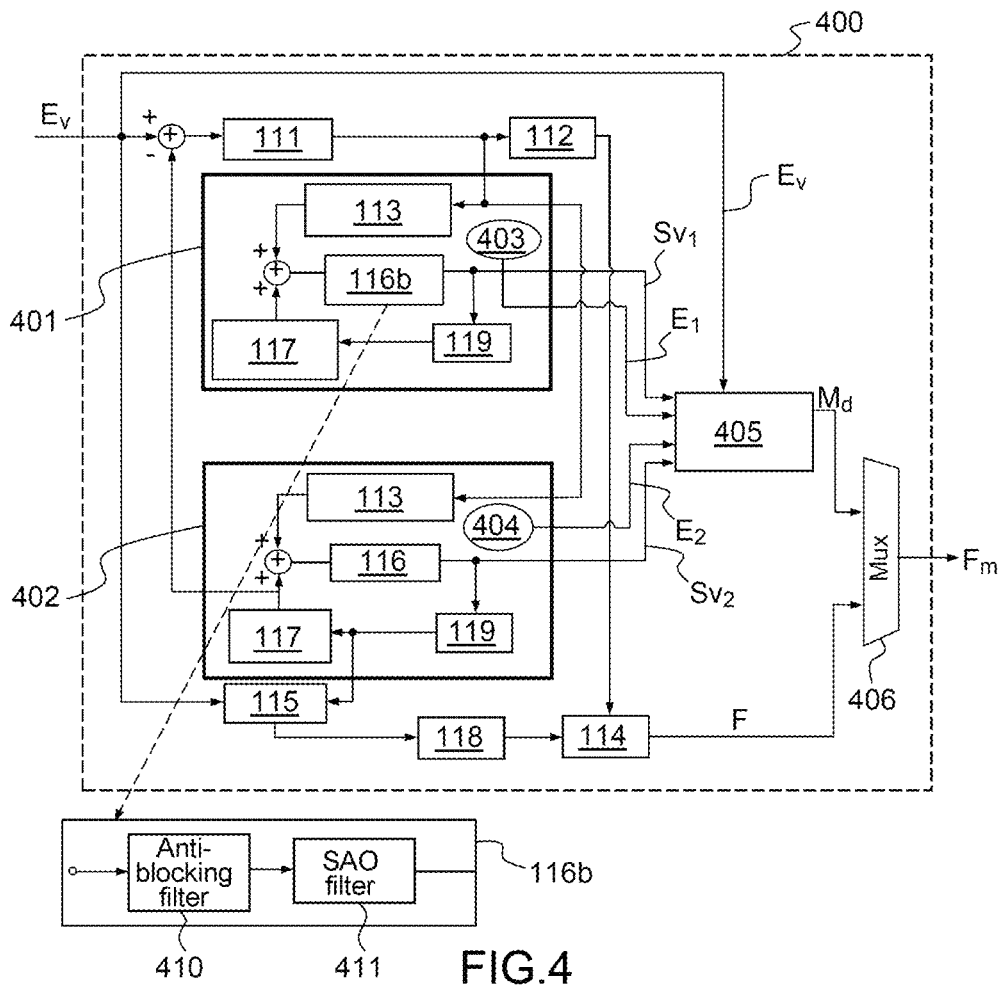
FIG. 4, a diagram showing the generation of metadata according to the invention, FIG. 5, a detail of the integration of the modified decoder within the structure of the encoder, FIGS. 6A and 6B, two curves representing the energy savings achieved, FIGS. 7A and 7B, two curves comparing the distortion between the HEVC standard and the HEVC standard modified according to the invention.

FIG. 4 illustrates an exemplary embodiment of a modified video encoder 400 according to the invention making it possible in particular to generate metadata $M_d$ used at the level of the modified final decoder. The modules known to the person skilled in the art and exhibiting functions identical to those introduced in FIG. 4 bear the same references and will not be detailed. The video encoder 400 comprises for example in parallel a standard video encoder module comprising a reference decoder 402 and a modified encoder module comprising a modified decoder 401. This structure makes it possible to generate the metadatum or metadata which will be used at the decoder level for the activation of the low-consumption filter chain. The standard video decoder 402 and the modified video decoder 401 each comprises a module making it possible to estimate the energy required for the decoding of the video stream and its playback, for example, a probe of energy or complexity of the stream, 403, 404.

A first modified video output $S_{v1}$, and a first estimated energy value $E_1$ are available as output from the modified encoder module comprising the decoder 401.

A second reference video output $S_{v2}$, and a second value of estimated decoding energy $E_2$ are available as output from the standard decoder module 402.

These four values are transmitted with the video input $E_v$ to a module for generating metadata 405. The metadatum or metadata are transmitted to a multiplexer and multiplexed by means of a multiplexer 406 with the compressed data stream. The stream comprising the compressed data stream and the metadatum or metadata is transmitted to a modified decoder according to the invention.

FIG. 4 shows diagrammatically a detail of the video decoder of the modified encoder. With respect to a standard decoder, the loop filter is modified, 116b, as is the motion compensation module which integrates a module estimating the energy 404. The modified loop filter 116b is, for example, composed of low-consumption filters, a low-consumption deblocking filter 410, followed by a low-consumption filter introducing a shift known by the abbreviation "SAO" (abbreviation of "Sample-adaptive Offset") 411 detailed in FIG. 5. It also comprises an energy estimation module 403.

Figure 6A:
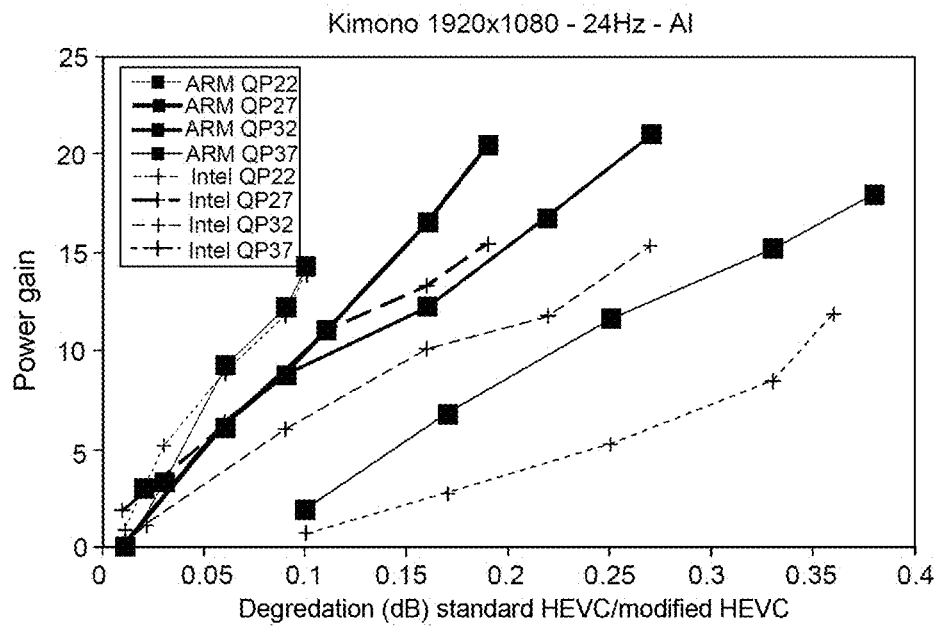
Figure 6B:
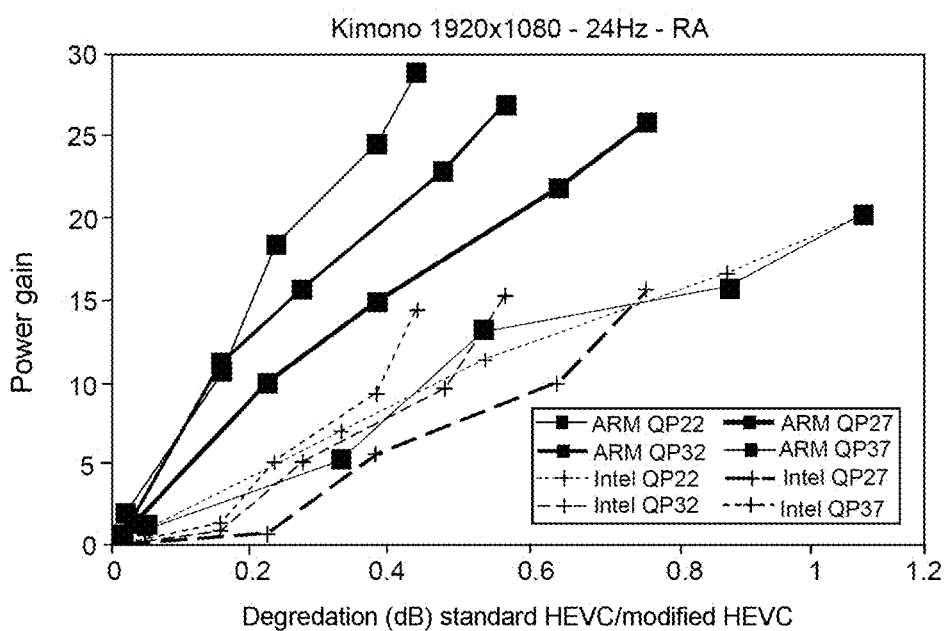

The estimated metadatum or metadata can be a metadatum of the type Gain in energy by degradation in quality GEDQ, this metadatum represents the slope as a percentage of energy gain per dB of signal-to-noise ratio of the curves represented in FIG. 6A and FIG. 6B, for example, corresponding to the image or to the sequence of images in progress. The metadatum can also be a gain in complexity by degradation in quality GCDQ. The complexity is readily computed by virtue of the number of computations required for the decoding. The metadatum can also represent the maximum gain in energy (MGE) (as a percentage) when the low-consumption filter is applied to the totality of the images of the decoded video. MGE can be computed thus: $MGE = 1 - (E_1/E_2) \ast 100$.

The metadata depend on the decoding hardware architecture, in particular of the processor. It is possible either to specify a pair (GEDQ, MGE) per type on processor for example, or to specify a mean value for each metadatum. It is also possible to specify triplets (coefficients of each filter, gain in energy, degradation in quality), thereby allowing the encoder to propose forms of filters which seem to it to be more appropriate to the decoding.

The metadata generator also estimates the decoding degradation introduced by the modified decoder. Accordingly, it can use as metric the power to noise ratio or $PSNR_{YUV}$ on the three components Y (Luminance) and (U,V) (Chrominance). Generally, the PSNR per image, expressed in decibels (dB), is measured thus:

$PSNR_{SV1}=10*\log 10(d^2/MSE)$ with $MSE=(E_v-S_{V2})^2$ corresponding to the mean square error measured between the video output $S_{V2}$ and the video input $E_V$, d corresponding to the maximum amplitude of the pixels, for example d=255 for pixels coded on 8 bits or d=1023 for pixels coded on 10 bits.

$PSNR_{SV2}=10*\log 10(d^2/MSE)$ with $MSE=(E_v-S_{V1})^2$ corresponding to the mean square error measured between the video output $S_{V1}$ and the video input $E_V$. The differences consider for example the videos, pixel by pixel, going from 0 to 255.

The PSNR of the sequence is the mean of PSNR over the set of images of the video sequence considered. Finally, the metric $PSNR_{YUV}$ is a weighted metric of the PSNR per component. The following weighting can be adopted: $PSNR_{YUV}=(6*PSNR_Y+PSNR_U+PSNR_V)/8$.

Two values of PSNR are thus computed: $PSNR_{SV2}$ on the basis of the image decoded by the reference decoder 401, and $PSNR_{SV1}$ on the basis of the image decoded by the modified decoder 402.

The metadatum GEDQ (Gain in Energy by Degradation in Quality) can be computed in the following manner: $MGE/(PSNR_{SV2}-PSNR_{SV1})$.

Other metrics measuring the subjective quality of the image can be used such as the Mean Opinion Score or MOS as a supplement or alternative to the PSNR metric.

The above examples have been given by expressing the normalized PSNR as a percentage. This percentage represents the gain between the standard scheme and the proposed level. More generally, the coding can use a dedicated scheme to represent this gain on N bits in the message/protocol. The gains in energy can follow a linear, logarithmic scale or else be coded on a reduced scale to limit the impact on the bitrate of the system.

Subject to a compromise of reduced quality of the decoded image, appreciable gains in energy consumption can be achieved. These gains are realized in particular by virtue of the use of the modified filtering functions, for example by simplifying them. The fact of offloading the computation for estimating the degradations in quality and the gains in energy of the modified decoder to the level of the encoder part of the system makes it possible to decrease the consumption in computational energy on the stream decoder side. It is the encoder of the system which will transmit the metadata which are sources of information on the potential gain in energy on the data sequence to be decoded and on the possible loss of quality. This also allows one and the same stream to address several decoders, each having its own energy management and decoding strategy.

FIG. 5 represents an exemplary decoder modified according to the invention. With respect to a standard video decoder the decoder comprises, in addition, a low-consumption filter chain which is activated or not according to constraints of a user and/or according to the battery level of the mobile terminal and of an activation indicator emitted by the activation module receiving at least the metadata.

One of the principles implemented in the method according to the invention is to use, at the level of the final decoder, so-called "low-consumption" filters in addition to the scheme of the standard video decoder. Applying the "low-consumption" loop filtering consists either in not filtering the data stream in progress, an image, or in using finite impulse response filters of shorter length than the filters specified in the standard. By filter length is meant the degree of complexity of a filter, its observation window. A numerical example of filters will be given after a general account aimed at explaining how the low-consumption filters used are defined.

The activation or otherwise of the "low-consumption" filters can be decided according to a pattern corresponding to an activation profile or according to a more complex scheme. The activation decision module can make activation choices in respect of the "low-consumption" filters according to numerous criteria. It can, for example, consider the energy remaining in the system (battery level still available), the real-time constraints of the decoding, the DVFS (Dynamic Voltage and Frequency Scaling) parameters of the processor concerned in order to adapt the operating frequency as closely as possible to the situation and the criteria of quality of rendition of the decoded video.

The generation, recalled hereinafter, of the filters is given in the standardization document "CE3: DCT derived interpolation filter test by Samsung", JCTVC-F247:

Generation of Even Filters $$EvenFilter_m(\alpha) = \frac{1}{M}\cos\left(\pi\frac{m-\alpha}{N-1}\right)\sum_{k=0}^{2M-1}\left(c_k^2\cos\left(\frac{(2m-1+2M)\pi k}{4M}\right)\cos\left(\frac{(2\alpha-1+2M)\pi k}{4M}\right)\right)$$

Generation of Odd Filters:

$$OddFilter_m(\alpha) = \frac{2}{2M+1}\cos\left(\pi\frac{m-\alpha}{N-1}\right)\sum_{k=0}^{2M}\left(c_k^2\cos\left(\frac{(2m+1+2M)\pi k}{2(2M+1)}\right)\cos\left(\frac{(2\alpha+1+2M)\pi k}{2(2M+1)}\right)\right)$$

with the following definitions
  m: index of the coefficient of the generated filter
  2.M: Size of the even filter
  2.M+1: Size of the odd filter
  Ck=$1/\sqrt{2}$ if k=0, Ck=1 otherwise.
  α: the interpolated position (e.g., 1/4, 2/4, 3/4)
  N: smoothing factor fixed at 9.5 (as in the prior art).

For a hardware implementation of these filters on low-consumption processors, the coefficients generated are converted to integer value with the following formula:

$$Filter_m(\alpha)=IntegerPart(Filter_m(\alpha)\cdot 2^6)$$

For example, by fixing M=4 for an even filter and α=1/2 it is possible to generate one of the reference filters of the standard. By fixing M=1 for an odd filter and α=1/2 the coefficients of the low-consumption filter are obtained.

The table below gives an example of values for the filters according to the standard and for a low-consumption filter according to the invention:

| α | Reference filter | Low-consumption filter |
|---|---|---|
| Interpolation filters for the luminances | | |
| 1/4 | (−1, 4, −10, 58, 17, −5, 1) | (−7, 58, 13) |
| 1/2 | (−1, 4, −11, 40, 40, −11, 4, −1) | (−9, 41, 32) |
| Interpolation filters for the chrominances | | |
| 1/8 | (−2, 58, 10, −2) | 64 |
| 1/4 | (−4, 54, 16, −2) | 64 |
| 3/8 | (−6, 46, 28, −4) | 64 |
| 1/2 | (−4, 36, 36, −4) | 64 |

According to another variant embodiment, we shall work with a given value for the parameter M which defines the size of the filter and will choose a quantization parameter, the number of bits on which the decimal representation of the coefficients is quantized, the objective being to reduce the complexity of the filters used.

In this variant implementation, for a hardware implementation of these filters on low-consumption processors, the coefficients generated are converted into integer value with the following formula:

$$Filter_m(\alpha) = IntegerPart(Filter_m(\alpha) \cdot 2^6)$$

where a is a coefficient which defines the number of bits on which the quantization is carried out, the value of a is chosen to be less than the quantization coefficient of the norm, currently equal to 6.

For example, currently the setup of a filter of the norm for the interpolation uses a quantization on six bits, and a filter comprising the following coefficients is obtained:

$$Filter_{1/2\_6b} = (-1, 4, -11, 40, 40, -11, 4, -1)$$

By quantizing on five bits, a=5, it is possible to obtain the following filter:
$Filter_{1/2\_5b} = (0, 2, -6, 20, 20, -6, 2, 0)$; generating the zero coefficients makes it possible to decrease the number of operations carried out at the level of the filter and therefore the complexity of the filter.

By quantizing on four bits, a=4, the following filter can be obtained:

$$Filter_{1/2\_4b} = (0, 0, -2, 10, 10, -2, 0, 0).$$

In the examples given, changing the quantizations gives rise to null coefficients which will be ignored during the filter computation. In fact, this amounts to reducing the number of coefficients to be processed and therefore to reducing the complexity of the filter.

According to another embodiment, reducing the complexity of setup consists in rounding the coefficients to their nearest rounded value to base 2. This variant embodiment can be implemented whatever quantization coefficient is used, six for the current norm, or less than six. All the coefficients of the filter or at least the majority of the coefficients are rounded to the power of 2 nearest their value.

Thus, the reference $Filter_{1/2}$ (interpolation of the luminances) given in the above table (−1, 4, −11, 40, 40, −11, 4, −1) then becomes $Filter_{1/2\_base2} = (-2^0, 2^2, -2^3, 2^5, 2^5, -2^3, 2^2, -2^0)$.

In order to guarantee a filtering gain equivalent to that obtained currently by the norm, a compensation is necessary. In this example, the compensation will be obtained by the value $(2^6/\Sigma Filter_{1/2\_base2})$, or more generally by $(2^a/\Sigma Filter_{\_base2})$ with $\Sigma Filter_{\_base2}$ representing the sum of the coefficients of the filter.

For the filter obtained with a quantization a=4, we will obtain $Filter_{1/2\_4b\_base2} = (-2^1, 2^3, 2^3, -2^1)$, with a compensation $(2^4/\Sigma Filter_{1/2\_4b\_base2} = 16/(-2+8+8-2) = 16/14 = 8/7)$.

In this filter embodiment, the reduction in complexity comes with the simplification of the filtering operations. Indeed, the necessary multiplications between the coefficients and the samples are replaced with simple "shifts of bits". As a function of the target chosen for the video decoder, the necessary number of "machine" cycles can be drastically reduced, for example, halved when it is assumed that multiplication and addition represent an equivalent complexity on the target.

At the level of the final decoder 500, the compressed data stream F originating from the demultiplexer 551 is transmitted to a first entropy decoding module 501, the decoded stream is transmitted to an inverse quantization and inverse transformation module 502, and to a decoding module of the Inter/intra frame type, 503. The reconstructed data Fr are transmitted to a loop filter 504 which comprises a first filtering chain 505 composed of a reference "deblocking" filter 506 followed by a reference SAO filter 507 whose output is linked to a video output 508, and a second low-consumption filtering chain 509 which comprises a first low-consumption "deblocking" filter 510 followed by a second low-consumption SAO filter 511. A first switch 512 makes it possible to steer the reconstructed data through the first, standard filter chain or the second, low-consumption filter chain as a function of an activation flag $C_d$ generated by the activation module 520, a second switch 514 steering the filtered data toward the video output.

Without departing from the scope of the invention, it is possible to envisage replacing the low-consumption filters with a line without a filter and ensuring solely the transmission of the data.

The video output $S_v$ is linked to a display device, not represented, and some of the images are also stored in a buffer memory 521 an output of which is linked to a motion compensation module 530. The motion compensation module comprises a switch 538 receiving the activation indicator $C_d$ so as to choose the filter chain to be used. The compensation module 530 comprises a first standard chain 531 comprising a first interpolation module for the luminance 532 followed by a first interpretation module for the chrominance 533 whose output is linked to a motion vector compensation module 534. A second low-consumption filter chain 535 comprises for example a low-consumption interpolation module 536 followed by a chroma interpolation module 537. A first switch 538 receives an activation command $C_d$ and allows the passage of the video images stored either in the low-consumption filtering chain, or in the standard chain, and a second switch 539 linking either the standard chroma interpolation module 531, or the low-consumption chroma interpolation module 535 to the motion compensation module.

The output of the compensation module is transmitted to the intra/inter mode selection module to be applied for the reconstruction of the data.

Without departing from the scope of the invention, the switches of the low-consumption decoding chain can be driven independently, it is possible to activate the low-consumption loop filter chain independently of the low-consumption chain of the interpolation filter. It is also possible to envisage a scheme in which the low-consumption filters of the loop filter are replaced with a transmission line for the data without action on the data, doing so as a function of the metadatum or metadata and/or of the operating constraints fixed by the user.

Activation Level

The activation level, expressed as a percentage, specifies the share of the images for which the "low-consumption"

filtering is applied. For example, an activation rate of 25% signifies that one decoded image in four is decoded with the "low-consumption" filtering mode. These images are distributed homogeneously over a given period. For example, by choosing a period of 12 images, image indices from 1 to 12 and an activation rate of 25%, images 2, 6 and 10 will be decoded with the "low-consumption" filtering mode and images 1, 3, 4, 5, 7, 8, 9, 11 and 12 will be decoded with the reference filtering mode of the HEVC standard, for example. The activation pattern thus defined can be written [2, 6, 10]. In this example, the patterns [1, 5, 9], [3, 7, 11] and [4, 8, 12] are also valid.

It is noted in FIG. 6A, FIG. 6B that the effect of the activation level on the signal-to-noise ratio of the decoded video depends on the video compression rate.

Figure 7A:
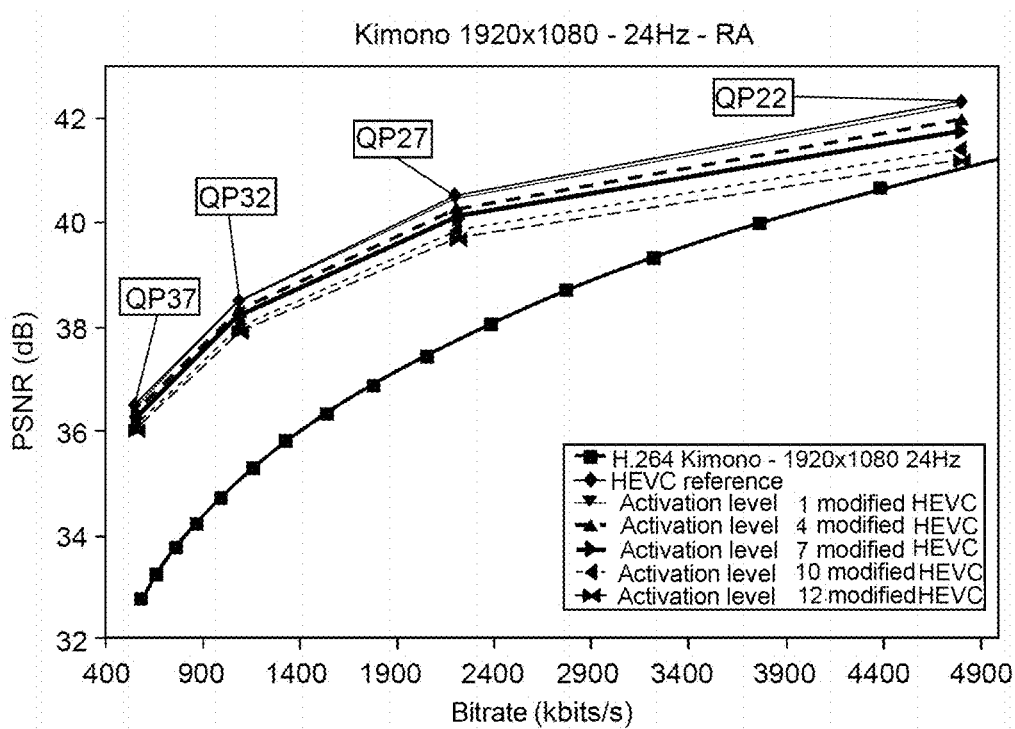
Figure 7B:
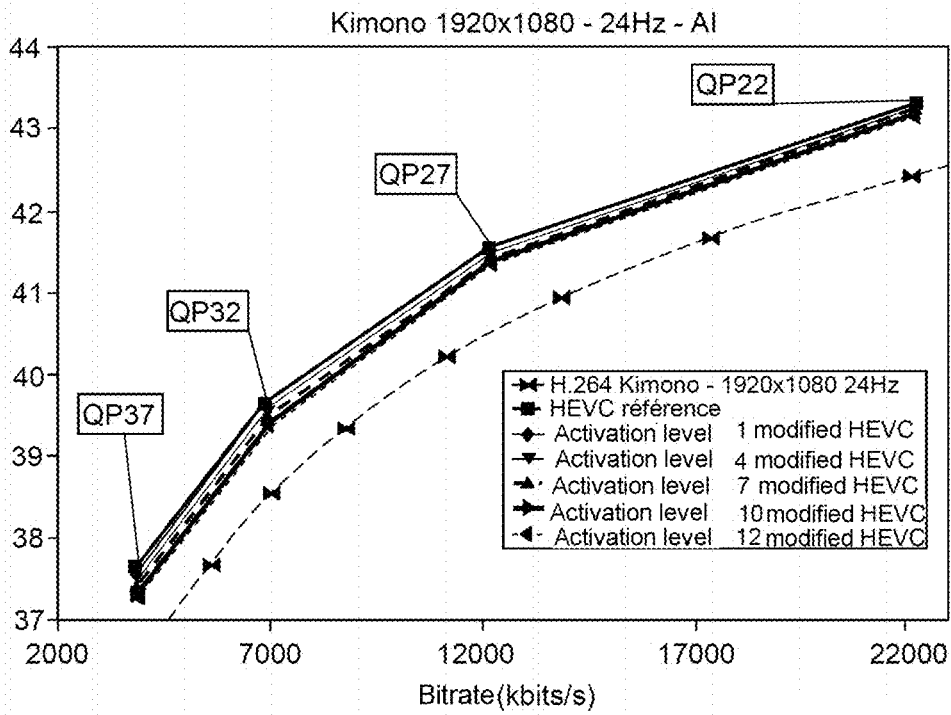

FIGS. 7A, 7B illustrate the consequence of the level of activation of the low-consumption filters on the signal-to-noise ratio of the decoded video.

The activation level makes it possible to select the low-consumption filters to be applied. Finer adjustment of the filtering parameters is possible, for example by choosing the images to which the low-consumption filtering will or will not be applied. Accordingly, the decision module receives an item of information on the type of frames contained in the data stream in progress. A decision will therefore be taken at the frame level to decide whether the method applies the unmodified filters or the modified filters.

For example, the types of images (I (intra), P (predicted) and B (bi-directional)) can be used to select image types whose filtering is fixed at the reference filtering or fixed at the "low-consumption" filtering. It is possible to define the following activation profiles according to the types of the encoded images:

| Activation profile | Images of type I | Images of type P | Images of type B |
|---|---|---|---|
| All | According to pattern | According to pattern | According to pattern |
| Except_I | Reference | According to pattern | According to pattern |
| Except_IP | Reference | Reference | According to pattern |
| Always_B | Reference | Reference | Low consumption |
| Always_BP | Reference | Low consumption | Low consumption |

In the case of the use of an activation profile, the information 550 regarding the type of decoded image is transmitted to the activation decision block by the entropy decoding.

The interpolation filter and "low-consumption" loop filter can be activated according to the same activation level and the same activation pattern. It is also possible to activate the interpolation filters and the loop filters independently. In this case, a different pattern and/or profile is used for each filter.

In the example which follows to illustrate the method according to the invention, twelve activation levels are proposed so as to obtain a maximum of 0.1 dB of distortion. By setting ActivationLevel {0 . . . 12}, the decoder can use the filters dynamically.

The functional module is adapted for deciding the moment and the frames that should be subjected to the simplified filters. For example, the table which follows indicates frame numbers to which the simplified filter method is applied:

| Activation level | Frame index number |
|---|---|
| 0 | Non activated - HEVC |
| 1 | (0) |
| 2 | (0, 6) |
| 3 | (0, 4, 8) |
| 4 | (0, 3, 6, 9) |
| 5 | (1, 3, 7, 9, 11) |
| 6 | (1, 3, 5, 7, 9, 11) |
| 7 | (0, 2, 4, 5, 6, 8, 10) |
| 8 | (1, 2, 4, 5, 7, 8, 10,11) |
| 9 | (1, 2, 3, 5, 6, 7, 9, 10, 11) |
| 10 | (1, 2, 3, 4, 5, 7, 9, 10, 11, 12) |
| 11 | (0, 1, 2, 3, 4, 5, 7, 8, 9, 10, 11) |
| 12 | New blocks always activated |

ADVANTAGES

The system according to the invention allows an adjustment of the energy power consumed with a priori knowledge of the video quality, without increasing the complexity on the decoder side. The "data" part of the stream or "bitstream" remains unchanged with respect to the prior art. Thus, all the decoders reading this stream can adapt their decoding to their battery level. In the system according to the invention, during normal operation, the filters of the standard part of the encoder are not modified, unlike an implementation which consists in using the same filters for the encoder side and the decoder side.

The invention claimed is:

1. A decoder for decoding multimedia data comprising:
at least one lower-energy-consumption decoding chain;
at least another decoding chain, wherein the lower-energy-consumption decoding chain consumes lower energy than the at least another decoding chain;
receiving from an encoder one or more metadata Md comprising a pair of values (maximum degradation, potential gain in energy) wherein the pair of values are computed during coding of the multimedia data while taking into account of: the multimedia data EV, data SV2 decoded by a standard decoder in the encoder, an energy value E2 estimated by the standard decoder, data SV1 decoded by a modified decoder in the encoder, and energy E1 estimated by the modified decoder; and
activating the least one lower-energy-consumption decoding chain or the at least another decoding chain based on the received one or more metadata Md comprising the pair of values.

2. A system for decoding multimedia data, comprising:
an encoder configured to provide one or more metadata $M_d$ comprising a pair of values (maximum degradation, potential gain in energy) wherein the pair of values are computed during coding of the multimedia data while taking into account of: the multimedia data Ev, data SV2 decoded by a standard decoder in the encoder, an energy value E2 estimated by the standard decoder, data SV1 decoded by a modified decoder in the encoder, and energy E1 estimated by the modified decoder; and
a decoder comprising at least one standard decoding chain and at least one lower-energy-consumption decoding chain, wherein the at least one standard decoding chain or the at least one lower-energy-consumption decoding chain is activated based on the received one or more metadata Md comprising the pair of values, wherein the at least one lower-energy-consumption decoding chain consumes lower energy than the at least one standard decoding chain.

3. The system as claimed in claim 2, wherein vales of the one or more metadata are computed in the following manner:
   determine gains in energy MGE=1−($E_1$/$E_2$)*100, with $E_1$ the energy estimated by the modified decoder, $E_2$ the energy estimated by the standard decoder,
   determine degradation of quality by computing PSNR value on a set of images of the multimedia data on basis of an image decoded by the standard decoder and on the basis of an image decoded by the modified decoder,
   $PSNR_{ReferenceDecoder}$=10*$\log_{10}$($d^2$/MSE), d corresponding to maximum amplitude of pixels, MSE corresponding to mean square error ($E_V$−$S_{V2}$)$^2$ between a reference data stream of the multimedia data $E_V$ and a data stream decoded by the standard decoder $S_{V2}$,
   $PSNR_{ModififedDecoder}$=10*$\log_{10}$($d^2$/MSE) with MSE corresponding to mean square error ($E_V$−$S_{V1}$)$^2$ between the reference data stream of the multimedia data $E_V$ and a data stream decoded by the modified decoder $S_{V1}$,
   computing value of the degradation of quality, Degradation=$PSNR_{Referencedecoder}$−$PSNR_{Modifieddecoder}$.

4. The system as claimed in claim 2, wherein the at least one standard decoding chain or the at least one lower-energy-consumption decoding chain is activated based on a measured level of energy remaining for a battery of a device comprising the decoder as well as the received one or more metadata Md comprising the pair of values.

5. The system as claimed in claim 2, wherein the at least one standard decoding chain comprises a loop filter which comprises a finite impulse response filter.

6. The system as claimed in claim 2, wherein the one or more metadata $M_d$ are determined on basis of values of maximum degradation, potential gain, and values of coefficients of a loop filter.

7. The system as claimed in claim 2, wherein the at least one lower-energy-consumption decoding chain is activated as a function of a type of frame or of a frame position in the multimedia data.

8. The system as claimed in claim 2, wherein the decoder is an H.264/AVC or H.265/HEVC decoder.

9. A method performed by a decoder for decoding multimedia data, comprising:
   receiving from an encoder one or more metadata Md comprising a pair of values (maximum degradation, potential gain in energy) wherein the pair of values are computed during coding of the multimedia data while taking into account of: the multimedia data Ev, data SV2 decoded by a standard decoder in the encoder, an energy value E2 estimated by the standard decoder, data SV1 decoded by a modified decoder in the encoder, and energy E1 estimated by the modified decoder; and
   activating a lower-energy-consumption decoding chain or a standard decoding chain based on the received one or more metadata Md comprising the pair of values.

10. The method as claimed in claim 9, wherein values of the one or more metadata are computed in the following manner:
    determine gains in energy MGE=1−($E_1$/$E_2$)*100, with $E_1$ the energy estimated by the modified decoder, $E_2$ the energy estimated by the standard decoder,
    determine degradation of quality by computing PSNR value on a set of images of the multimedia data stream on basis of an image decoded by the standard decoder and on basis of an image decoded by the modified decoder,
    $PSNR_{ReferenceDecoder}$=10*$\log_{10}$($d^2$/MSE), d corresponding to maximum amplitude of pixels, MSE corresponding to mean square error ($E_V$−$S_{V2}$)$^2$ between reference data stream of the multimedia data $E_V$ and a data stream decoded by the standard decoder $S_{V2}$,
    $PSNR_{ModififedDecoder}$=10*$\log_{10}$($d^2$/MSE) with d corresponding to the maximum amplitude of the pixels, MSE corresponding to mean square error ($E_V$−$S_{V1}$)$^2$ between the reference data stream of the multimedia data $E_V$ and a data stream decoded by the modified decoder $S_{V1}$,
    compute a value of degradation of quality, Degradation=$PSNR_{Referencedecoder}$−$PSNR_{Modifieddecoder}$.

11. The method as claimed in claim 10, wherein d is chosen equal to 255.

12. The method as claimed in claim 9, wherein a measurement of energy level for a battery is used as an energy constraint.

13. The method as claimed in claim 9, wherein the decoder is an H.264/AVC or H.265/HEVC decoder.

* * * * *

UNITED STATES PATENT AND TRADEMARK OFFICE
CERTIFICATE OF CORRECTION

PATENT NO. : 10,531,096 B2
APPLICATION NO. : 15/519333
DATED : January 7, 2020
INVENTOR(S) : Erwan Nogues et al.

It is certified that error appears in the above-identified patent and that said Letters Patent is hereby corrected as shown below:

In the Claims

In Claim 3, Column 13, Line 4, delete "vales" and insert --values--.

Signed and Sealed this
Eighteenth Day of February, 2020

Andrei Iancu
*Director of the United States Patent and Trademark Office*